United States Patent [19]

Catcher

[11] Patent Number: 5,244,365

[45] Date of Patent: Sep. 14, 1993

[54] OIL SPILL CLEANUP APPARATUS

[76] Inventor: Mikie B. Catcher, 1515 Weaver St., Scarsdale, N.Y. 10583

[21] Appl. No.: 844,156

[22] Filed: Mar. 2, 1992

Related U.S. Application Data

[63] Continuation-in-part of Ser. No. 734,043, Jul. 22, 1991, abandoned, which is a continuation of Ser. No. 470,371, Jan. 25, 1990, abandoned, and a continuation of Ser. No. 703,249, May 20, 1991, Pat. No. 5,141,632.

[51] Int. Cl.$^5$ .................. F04B 21/02; F04B 39/10
[52] U.S. Cl. .................... 417/569; 417/313; 417/61; 210/242.3; 210/923
[58] Field of Search .............. 417/569, 570, 313, 61, 417/454; 210/122, 242.3, 923

[56] References Cited

U.S. PATENT DOCUMENTS

| | | | |
|---|---|---|---|
| 157,760 | 12/1874 | Reamy | 417/61 |
| 2,399,245 | 4/1946 | Parker | 417/454 |
| 3,549,015 | 12/1970 | Willinger | 417/569 |
| 3,802,802 | 4/1974 | Greer | 417/313 |
| 4,906,366 | 3/1990 | Moore | 210/242.3 |
| 4,974,674 | 12/1990 | Wells | 210/242.3 |
| 5,108,591 | 4/1992 | Hagan | 210/122 |

*Primary Examiner*—Richard A. Bertsch
*Assistant Examiner*—Charles G. Freay
*Attorney, Agent, or Firm*—Baker, Maxham, Jester & Meador

[57] ABSTRACT

A cleanup apparatus for pumping oil and/or debris laden liquid from remote areas comprises an elongated tubular barrel having a distal end and a proximal end, an elongated plunger having a piston thereon reciprocably mounted in said barrel, a valving assembly detachably mounted on the distal end of said barrel and comprising an inlet conduit defining an inlet port and an outlet conduit defining an outlet port, a one-way inlet valve in the inlet port, and a one-way outlet valve in the outlet port, and a remote positionable floating intake assembly.

13 Claims, 2 Drawing Sheets

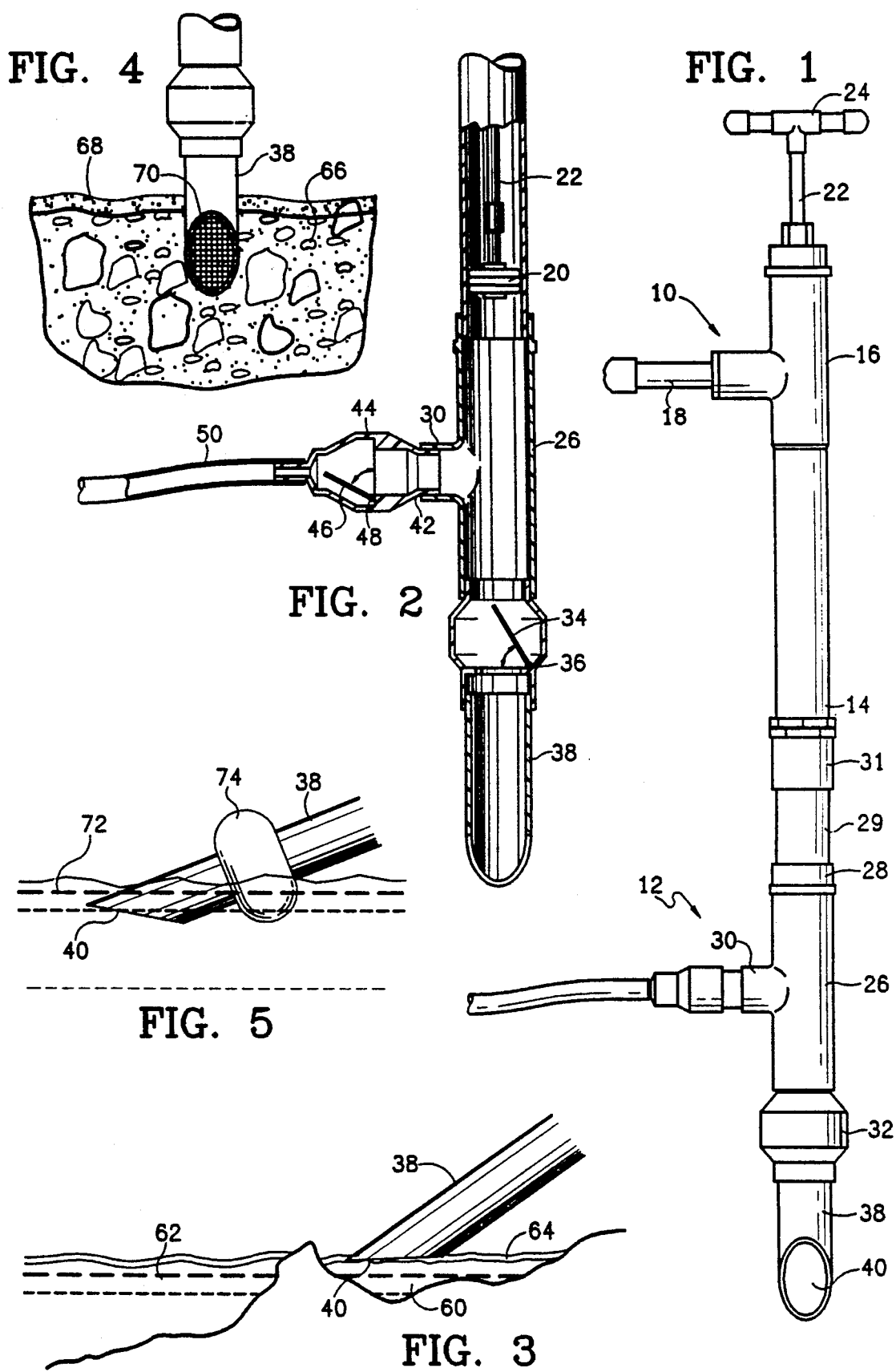

5,244,365

OIL SPILL CLEANUP APPARATUS

REFERENCE TO RELATED APPLICATIONS

This is a continuation-in-part of application Ser. No. 07/734,043, filed Jul. 22, 1991, which was a continuation of Ser. No. 07/470,371, filed Jan. 25, 1990, now abandoned, and of application Ser. No. 07/703,249, filed May 20, 1991, now U.S. Pat. No. 5,141,632, dated Aug. 25, 1992.

BACKGROUND OF THE INVENTION

The present invention relates to extraction devices and pertains particularly to an improved oil spill cleanup apparatus.

Oil spills on the world's oceans and waterways are a frequent occurrence in modern times due to the high volume of petroleum, crude and other products transported over the waterways. The products of these oil spills are frequently swept by wind, waves and currents to the world's beaches and coastlines before they can be contained and recovered. It is desirable that these spills be cleaned from the coastline as rapidly as possible.

Many coastline areas are remote and rugged with various conditions, including rocky shores and beaches, tide pools, and other conditions. Once oil has been swept to these areas, it is difficult to extract or recover and remove from the areas.

Once a remote rugged coastline has been contaminated with oil and the like, it is difficult to clean because of its inaccessibility. The common practice is to attempt to clean the shores by means of straw or other absorbent materials placed over the areas in an effort to absorb the oil. The absorbent materials are then removed and disposed of.

The present invention was developed as an improved manually operable portable means of extracting oil from remote and rugged shorelines and the like as an environmentally safe technology.

SUMMARY AND OBJECTS OF THE INVENTION

It is the primary object of the present invention to provide an environmentally safe and improved manually operable portable oil cleanup apparatus for difficult to reach areas, such as coves, inlets, outlets and the like, including oceans.

In accordance with a primary aspect of the present invention, a cleanup apparatus for pumping oil and/or debris laden liquid from remote areas comprises an elongated tubular barrel having a distal end and a proximal end, an elongated plunger having a piston reciprocably mounted in said barrel, and a valving assembly detachably mounted on the distal end of said barrel, and comprising an inlet conduit defining an inlet port, and an outlet conduit defining an outlet port, a one-way inlet valve in said inlet port, and a one-way outlet valve in said outlet port.

Another aspect of the invention includes remoteably positionable intake means for reaching and drawing fluids from areas remote from the manual operator.

BRIEF DESCRIPTION OF THE DRAWING

The above and other objects and advantages of the present invention will become apparent from the following description when read in conjunction with the accompanying drawings wherein:

FIG. 1 is a side elevation view illustrating a preferred embodiment of the invention;

FIG. 2 is a detailed section view through a lower portion of the embodiment of FIG. 1;

FIG. 3 is a detailed partial view illustrating a mode of use of the embodiment of FIG. 1;

FIG. 4 is a view like FIG. 3 illustrating an alternate embodiment of the invention;

FIG. 5 is a view like FIG. 3 illustrating a further embodiment of the invention;

DETAILED DESCRIPTION OF A PREFERRED EMBODIMENT

Figure 7:
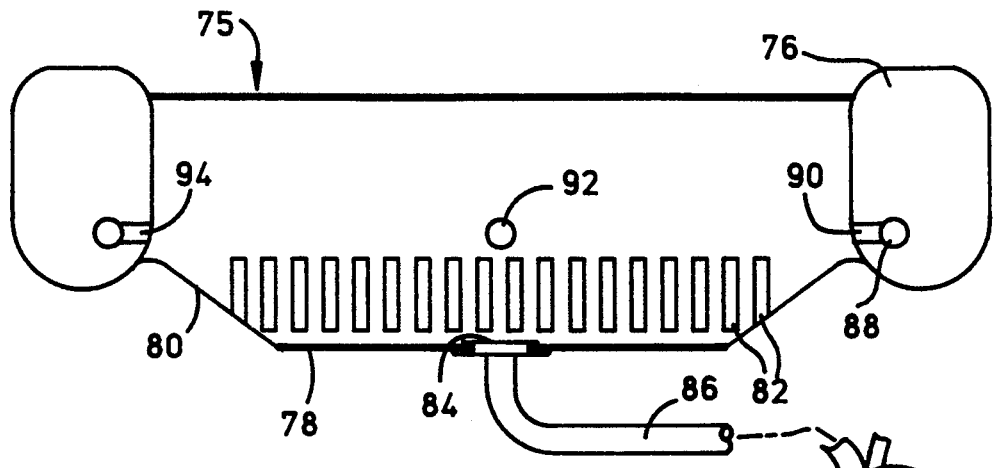
FIG. 7 is a side elevation view in section of the embodiment of FIG. 6.

Referring to the drawings, and particularly to FIGS. 1 and 2, there is illustrated an exemplary embodiment of the invention. The invention, as illustrated, comprises a combination of a clam digger, as disclosed and claimed in my prior U.S. Pat. No. 4,653,791, granted Mar. 31, 1987, and a new valving assembly or modification. The apparatus comprises a kit formed of an upper unit 10, as set forth in my prior U.S. patent, and a lower unit 12 and other intake attachments, as will be more fully described herein. The upper unit 10 comprises an elongated cylindrical barrel 14 having an upper portion 16, with a handle 18 extending outward therefrom. A plunger is reciprocably mounted in the barrel, and includes a piston 20 secured to the lower end of a piston rod 22 having a handle 24 secured to the upper end thereof. This unit, as set forth in my aforesaid patent, which is incorporated herein by reference as though fully set forth, is a hand operated extractor, which is normally used as a clam digger, bait catcher or the like. However, it is selectively used herein as an extractor or digger for extracting quantities of oil contaminated wet soils. It is also used as a hand pump.

The valving unit 12, which is detachably attached to the lower normally open end of the unit 10, comprises a valving assembly which effectively turns the combination into a portable pump, which may be either hand or power operated, as will be more fully explained. The valving unit, as illustrated, comprises a central or main body unit 26 in the form of an elongated tubular member having a suitable coupling 28 at the upper end thereof, and a ninety degree coupling 30 intermediate the upper and lower ends thereof. The coupling member 28 detachably couples the valving unit 12 to the lower end of an extension 29, 31 (FIG. 1) or the barrel 14. This coupling may be detachable to accommodate an extension 29 and coupling 31, or may be attached directly to the lower end of the barrel 14 (FIG. 2).

A valve assembly 32 comprises a one-way valve unit 32 coupled to the lower or intake end of tubular member 26, and includes a flapper valve 34 pivotally connected by suitable hinge 36 to the interior of the valve body 36. The valve body is preferably enlarged compared to the upper tubular member 26, and in inlet conduit 38 to provide a flow diameter substantially equal to the diameter of the inlet conduit 38.

The inlet conduit 38 may have any suitable length to enable remote hand manipulation, and is coupled to the lower end of the valve unit 32. The inlet conduit 38 preferably has an inlet opening 40 that is at an angle to the axis of the barrel thereof to align with a water surface outward from an operator. This angle is some-where between about sixty and forty-five degrees for improved suction or pick-up, as will be explained. It should be noted that it is not necessary that the inlet opening be entirely submerged for the unit to operate satisfactorily.

The valve 32 in its preferred form is an off-the-shelf flapper valve available from plumbing supply houses. This valve is preferably on the order of about two inches in internal diameter for a typical application. However, larger diameters may be utilized, such as three and a half to four inches in diameter for hand operated portable models.

The outlet from the valving system is by way of a nipple 42 to which an outlet flapper valve 44 is connected. This valve unit 44, as in the previous embodiment, comprises a flapper valve member 46 pivotally connected at 48 inside the housing, and normally seats against an annular seat to provide one-way flow outward from the central unit 26. A flexible flow line or tube 50 is connected to the outlet port or conduit of the valving system unit for conveying the pumped liquid to a suitable container, such as an oil drum or the like. The outlet conduit and flow lines need not be as large as the inlet conduit for most applications. However, for some applications, it may be desirable to have the outlet equal that of the inlet to carry debris without clogging. The flapper valves provide optimum flow, with minimum pressure to open reduced likelihood of clogging or plugging by debris.

The central unit 26 is preferably of sufficient length and diameter to contain substantially an equal volume of fluid as that of barrel 14. This enables pumping with a full stroke of the piston 20, with a full flow of liquid, with the pumped liquid flowing upward into the interior of the pumping barrel 14.

It is anticipated that the liquid pumped will not contain sand, gravel and other debris that would be detrimental to the piston 20 and barrel in which it reciprocates in most situations. This arrangement thus provides a full flow pumping unit, without the fluid passing upward through the inside of main barrel of the pump. The major portion of the entire unit is preferably constructed of lightweight plastic pipe, such as PVC.

Referring to FIG. 3, there is illustrated an exemplary position of the intake conduit 38, with inlet port 40 as illustrated. As illustrated, the inlet conduit 38 is positioned at an angle to the surface of a tide pool body of water 60 at the shore of a water body 62, such that it primarily skims from the body 60 a layer 64 of crude oil or other product. The device is capable of pumping with the port or opening 40 only partially submerged, and in many or most instances, it will pump both oil, water and air. Oil will normally float on top of the water, however does fluctuate from surface/sub-surface depths, such that skimming action can be normally accomplished with manual pumping and manipulation of the apparatus from the shoreline and small boats. This is particularly adaptable for small pools of oil and boomed areas (containment booms).

Referring to FIG. 4, there is illustrated a sandy, rocky environment wherein a pool of water 66 has a layer of oil or the like 68 floating thereon. The form of the body 66 is confined within a pool formed by rocks, sand and other debris. The barrel inlet or conduit 38 is positioned vertically within the pool, with a screen covering 70 over the opening 40 to inhibit the drawing of pebbles, rock and other debris into the unit. Screens of varying mesh may be utilized, depending on the environment circumstances.

Referring to FIG. 5, an additional embodiment of the invention includes the barrel 38 having a length sufficient to enable the operator to reach the inlet to areas several yards outward beyond the position of operation thereof. In addition, as illustrated in FIG. 5, the inlet conduit 38 may be extended outward from the shore over a body of water 72, and be supported at its outer or inlet end by one or more floats 74. This enables the extension, manipulation and use of the device at extended areas away from the operator. The operator can easily reach twenty to thirty feet, and sometimes as much as fifty feet away. It may also be connected by a flexible line or conduit, as shown and described in FIGS. 6 and 7.

Figure 6:
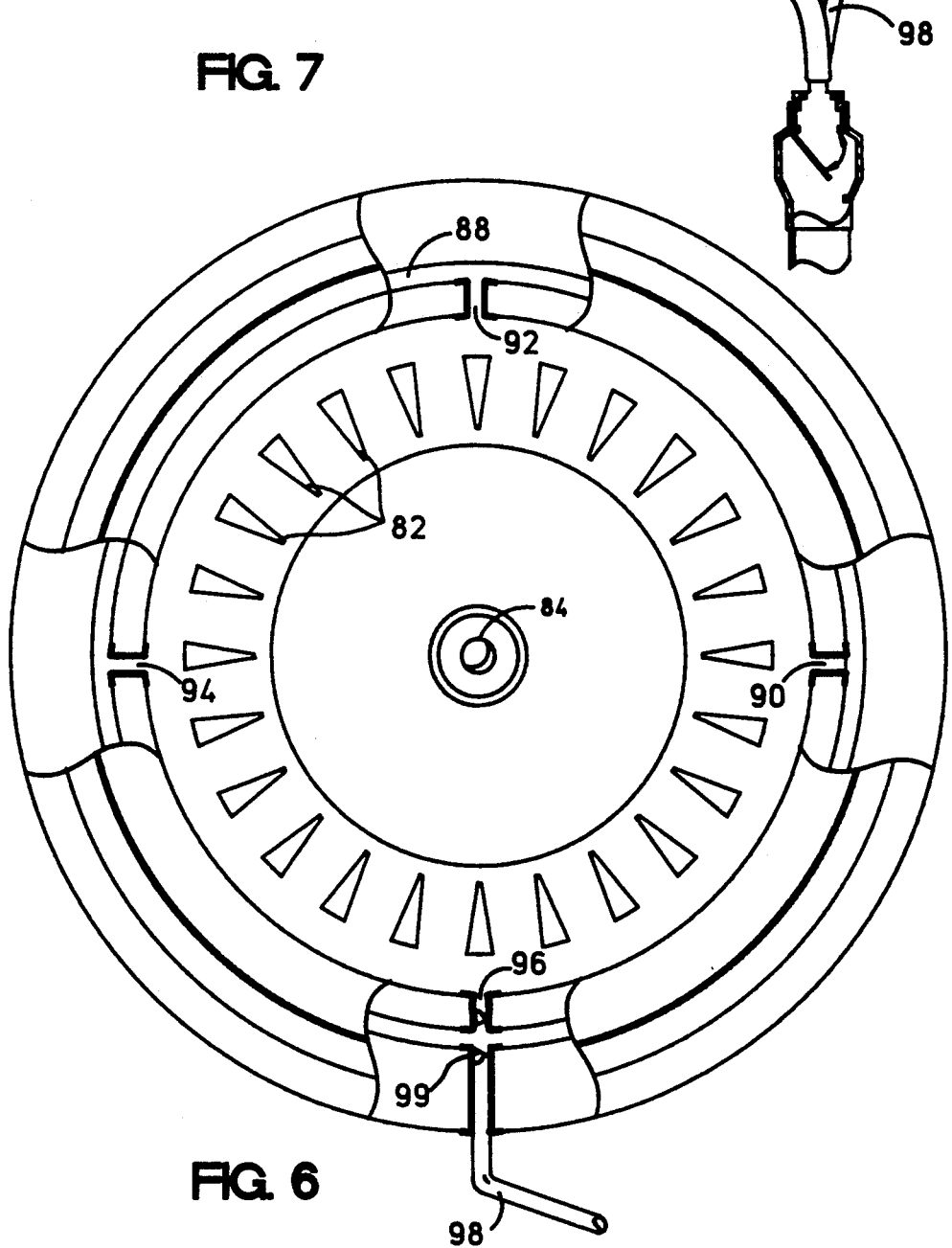
FIG. 6 is a top plan view of a still further embodiment.

Referring to FIGS. 6 and 7, an alternate floating intake system comprises a floating assembly, designated generally at 75, comprising a circular or peripheral float 76, which may be a ring of impervious foam or the like for supporting the skimming intake structure in a remote position on or near the surface of a body of water or the like. Disposed within the float is a circular plate or disc 78 having slightly upwardly sloping peripheral edge 80 secured to and supported by the float 76 concentrically therewith. A plurality of slot openings 82 are formed in the upturned portion of the disc for admitting liquid from at or just below a water surface to the interior thereof. A central drain or intake opening 84 communicates with an elongated flexible tubing or conduit 86 to the inlet of the pump assembly via a Y connection to inlet valve 32.

As shown in FIG. 7, the circular disc 78 is disposed slightly below the circular float 72, and the slots 82 therein permit the flow of surface liquids into the central area where it is skimmed off by the intake 84. A plurality of peripheral intake ports 90, 92, 94 and 96 are formed in a circular conduit 78, which is disposed inside the float 76 and positioned to be disposed at just slightly below the water surface but above inlet 84 and slots 82. These intake ports draw surface oil and the like from the surface of water within the float. A similar peripheral conduit with similar intake ports may also extend around the outer periphery of the float assembly to draw surface liquids from the surrounding area.

The peripheral intake assembly includes a plurality of the intake ports or slots 90-96 into the tubular ring 88. The tubular ring 88 communicates by way of an elongated tubular flexible conduit 98 to the pump assembly 10. The inlet 84 is connected to the pump by an elongated flexible conduit 86. A one-way flapper valve 99 may be provided at the inlet to intake ports or the intake at 98 to prevent backflow. The floating skimmer unit 14 should be on the order of about five feet in diameter to enable manual handling, but may be smaller or larger for certain applications.

In operation, the assembly, as illustrated in FIG. 1, is taken to the scene of an oil spill or the like, which preferably has been boomed off by floating booms to contain the spill. The pump assembly is hand held by an operator who may be standing on land or supported on a boat or watercraft or other suitable support structure, while the skimming intake assembly 75 is positioned within the spill area by hand or other means. The intake assembly is connected by elongated flexible tubular conduits 86 and 98 to the pump assembly, and permitted to float or move throughout the spill area, skimming water and oil from the surface thereof, and placing it in any suitable containers, such as barrels or the like. The skimming unit 75 may also be moved about an area by means of a boat, aircraft or other suitable means. A large number of the skimmer units may be placed on a boat or other support structure and positioned or moved about a spill area.

Still further modifications of the device can include mounting of the device on suitable water vessels, such as boats, barges and the like, and powering the unit by motors, such as electrical or internal combustion engines. Suitable mechanical movement mechanisms, such as cranks and linkages are known, which are capable of attachment to the plunger for operation thereof by conversion of the engines rotary motion to a reciprocating motion of the plunger.

While I have illustrated and described my invention by means of specific embodiments, it is to be understood that numerous changes and modifications may be made therein without departing from the spirit and scope of the invention as defined in the appended claims.

I claim:

1. A portable hand held and operated cleanup apparatus for pumping oil and/or debris laden liquid from water surfaces in remote areas comprising:

hand operated piston suction means comprising an elongated tubular barrel having a distal end and a proximal end, a handle extending outward from said barrel near said proximal end, and an elongated plunger having a piston reciprocally mounted in said barrel, said suction means operable in a first mode for extracting material from water laden surface and underwater soil;

a valving assembly for detachably mounting on the distal end of said barrel and comprising an elongated first tubular section having a diameter equal to the diameter of the barrel aligned with said barrel, an inlet port extending coaxially of said first tubular section and having an open end defining an inlet port and an outlet port extending at a right angle to said tubular section, a one-way inlet valve in said inlet port, and a one-way outlet valve in said outlet port, said valving assembly operable with said suction means in a second mode for pumping liquids from water surfaces and subsurfaces, said first tubular section has a volume at least as great as that of said barrel so that a full upward stroke of the plunger draws primarily liquid into the barrel from said tubular section; and a hand manipulable remotely positionable floating intake assembly comprising a first elongated lightweight conduit having an outer end, a remote intake port at said outer end and a length to enable remote hand manipulation of said outer end, said intake port being disposed at an acute angle to the axis of said conduit for manual alignment with a water surface, said first elongated conduit means detachably connecting said intake port to said suction means, and a float for supporting said outer end and remote intake port near the surface of a body of water for enabling the pumping of liquid from said surface and near said surface in a first pumping mode.

2. A cleanup apparatus according to claim 1 wherein: said intake port extends at an angle of from about forty-five to about sixty degrees to the axis of said conduit for substantial alignment with a water surface.

3. A cleanup apparatus according to claim 2 wherein said inlet valve and said outlet valve are each flapper valves having a flow through diameter substantially equal to the diameter of the respective inlet and outlet conduits.

4. A cleanup apparatus according to claim 1 further comprising a remotely positionable floating intake assembly comprising a ring shaped circular float, a circular plate secured coaxially with said float, a plurality of inlet slots around the periphery of said circular plate, an inlet opening in the center of said plate, and a plurality of inlet openings spaced around the inside periphery of said float for floating on a liquid surface remote from said pump means for receiving liquid from said liquid surface; and elongated flexible conduit means for detachably connecting said floating intake assembly to said pump means in a second pumping mode.

5. A portable hand held and operated cleanup apparatus for pumping oil and/or debris laden liquid from water surfaces in remote areas comprising:

hand operated piston suction means comprising an elongated tubular barrel having a distal end and a proximal end, a handle extending outward from said barrel near said proximal end, and an elongated plunger having a piston reciprocably mounted in said barrel, said suction means operable in a first mode for extracting material from water laden surface and underwater soil;

a valving assembly for detachably mounting on the distal end of said barrel and comprising an elongated first tubular section having a diameter equal to the diameter of the barrel aligned with said barrel, an inlet port extending coaxially of said first tubular section and having an open end defining an inlet port and an outlet port extending at a right angle to said tubular section, a one-way inlet valve in said inlet port, and a one-way outlet valve in said outlet port, said valving assembly operable with said suction means in a second mode for pumping liquids from water surfaces and subsurfaces;

a remotely positionable floating intake assembly comprising a ring shaped circular float, a circular plate secured coaxially with said float, a plurality of inlet slots around the periphery of said circular plate, an inlet opening in the center of said plate, and a plurality of inlet openings spaced around the inside periphery of said float for floating on a liquid surface remote from said pump means for receiving liquid from said liquid surface; and elongated flexible conduit means for connecting said floating intake assembly to said valving assembly.

6. A cleanup apparatus according to claim 2 wherein: said inlet valve and said outlet valve are each flapper valves having a flow through diameter substantially equal to the diameter of the respective inlet and outlet conduits.

7. A portable hand manipulated and operated cleanup apparatus having multiple modes for cleaning oil spills and the like from soil and from water surfaces in remote areas comprising:

hand operated piston pump means comprising an elongated tubular barrel having a distal end and a proximal end, a handle extending outward from said barrel near said proximal end, and an elongated plunger having a piston reciprocably mounted in said barrel, said pump means operable in a first mode for extracting material from water laden surface and underwater soil;

a valving assembly for detachably mounting on the distal end of said barrel and comprising an elongated first tubular section having a diameter equal to the diameter of the barrel aligned with said barrel, an inlet port extending coaxially of said first tubular section and having an open end defining an inlet port and an outlet port extending at a right angle to said tubular section, a one-way inlet flapper valve in said inlet port, and a one-way outlet flapper valve in said outlet port, said valving assembly operable with said pump means in a pumping mode for pumping liquids from water surfaces and subsurfaces;

a first remotely positionable floating intake assembly comprising first elongated conduit means having a remote intake port disposed at an angle to the axis thereof and said first conduit means having a length for remote manipulation of said intake port, a float for supporting said remote intake port near the surface of a body of water for enabling the pumping of liquid from said surface and near said surface, said first intake assembly detachably connectable to said valving assembly for defining a first pumping mode; and a second remotely positionable floating intake assembly comprising a ring shaped circular float, a circular plate secured coaxially with said float, a plurality of inlet slots around the periphery of said circular plate, an inlet opening in the center of said plate, and a plurality of inlet openings spaced around the inside periphery of said float, said second intake assembly adapted for floating on a liquid surface remote from said pump means for receiving liquid from said liquid surface, and elongated flexible conduit means for detachably connecting said floating intake assembly to said valving assembly for defining a second pumping mode.

8. A cleanup apparatus according to claim 7 wherein said intake port is defined by an opening extending at an angle of from about forty-five to about sixth degrees to the axis of said conduit for substantial alignment with a water surface.

9. A cleanup apparatus according to claim 8 including a screen covering said intake port for inhibiting the passage of debris into said conduit.

10. A cleanup apparatus according to claim 9 wherein said first tubular section has a volume at least as great as that of said barrel so that a full upward stroke of the plunger does draw liquid into the barrel.

11. A portable hand manipulated and operated cleanup apparatus having multiple modes for cleaning oil spills and the like from soil and from water surfaces in remote areas comprising:

hand operated piston pump means comprising an elongated tubular barrel having a distal end and a proximal end, a handle extending outward from said barrel near said proximal end, and an elongated plunger having a piston reciprocably mounted in said barrel, said pump means operable in a first mode for extracting material from water laden surface and underwater soil;

a valving assembly for detachably mounting on the distal end of said barrel and comprising an elongated first tubular section having a diameter equal to the diameter of the barrel aligned with said barrel, an inlet port extending coaxially of said first tubular section and having an open end defining an inlet port and an outlet port extending at a right angle to said tubular section, a one-way inlet flapper valve in said inlet port, and a one-way outlet flapper valve in said outlet port, said valving assembly operable with said pump means in a second mode for pumping liquids from water surfaces and subsurfaces; and a remotely positionable floating intake assembly comprising a ring shaped circular float, a circular plate secured coaxially with said float, a plurality of inlet slots around the periphery of said circular plate, an inlet opening in the center of said plate, and a plurality of inlet openings spaced around the inside periphery of said float for floating on a liquid surface remote from said pump means for receiving liquid from said liquid surface, and an elongated flexible conduit means for connecting said floating intake assembly to said valving assembly.

12. A portable hand manipulated and operated cleanup apparatus having multiple modes for cleaning oil spills and the like from soil and from water surfaces in remote areas comprising:

hand operated piston pump means comprising an elongated tubular barrel having a distal end and a proximal end, a handle extending outward from said barrel near said proximal end, and an elongated plunger having a piston reciprocably mounted in said barrel, said pump means operable in a first mode for extracting material from water laden surface and underwater soil;

a valving assembly for detachably mounting on the distal end of said barrel and comprising an elongated first tubular section having a diameter equal to the diameter of the barrel aligned with said barrel and a volume at least as great as that of said barrel so that a full upward stroke of the plunger does draw liquid into the barrel, an inlet port extending coaxially of said first tubular section and having an open end defining an inlet port and an outlet port extending at a right angle to said tubular section, a one-way inlet flapper valve in said inlet port, and a one-way outlet flapper valve in said outlet port, said valving assembly operable with said pump means in a second mode for pumping liquids from water surfaces and subsurfaces; and a remotely positionable floating intake assembly comprising a ring shaped circular float, a circular plate secured coaxially with said float, a plurality of inlet slots round the periphery of said circular plate, an inlet opening in the center of said plate, and a plurality of inlet openings spaced around the inside periphery of said float for floating on a liquid surface remote from said pump means for receiving liquid from said liquid surface, and elongated flexible conduit means for detachably connecting said floating intake assembly to said valving assembly for defining a first pumping mode.

13. A cleanup apparatus according to claim 12 further comprising a second floating intake assembly which comprises an elongated inlet conduit having an inlet end supported on said float and having an intake port defined by an opening extending at an angle of from about forty-five to about sixty degrees to the axis of said conduit for alignment with a water surface and detachably connectable to said valving assembly for defining a second pumping mode.

* * * * *